United States Patent
Coulombe et al.

(10) Patent No.: US 11,436,489 B2
(45) Date of Patent: Sep. 6, 2022

(54) COMBINING STATISTICAL METHODS WITH A KNOWLEDGE GRAPH

(71) Applicant: INTUIT INC., Mountain View, CA (US)

(72) Inventors: Gregory Kenneth Coulombe, Sherwood Park (CA); Roger C. Meike, Redwood City, CA (US); Cynthia J. Osmon, Sunnyvale, CA (US); Sricharan Kallur Palli Kumar, Mountain View, CA (US); Pavlo Malynin, Menlo Park, CA (US)

(73) Assignee: INTUIT INC., Mountain View, CA (US)

( * ) Notice: Subject to any disclaimer, the term of this patent is extended or adjusted under 35 U.S.C. 154(b) by 478 days.

(21) Appl. No.: 16/693,593

(22) Filed: Nov. 25, 2019

(65) Prior Publication Data

US 2021/0158144 A1    May 27, 2021

(51) Int. Cl.
*G06N 3/08*    (2006.01)
*G06F 16/901*  (2019.01)
*G06N 3/04*    (2006.01)
*G06F 40/30*   (2020.01)
*G06F 16/36*   (2019.01)

(52) U.S. Cl.
CPC ............. *G06N 3/08* (2013.01); *G06F 16/367* (2019.01); *G06F 16/9024* (2019.01); *G06F 40/30* (2020.01); *G06N 3/04* (2013.01)

(58) Field of Classification Search
CPC ...... G06F 16/9024; G06F 40/30; G06F 16/36; G06F 16/367
See application file for complete search history.

(56) References Cited

U.S. PATENT DOCUMENTS

| 6,076,088 A | * | 6/2000 | Paik ................... G06F 16/353 707/999.005 |
| 10,607,298 B1 | | 3/2020 | Hanekamp, Jr. et al. |
| 2005/0187913 A1 | * | 8/2005 | Nelken ................ G06F 16/285 |
| 2016/0063106 A1 | * | 3/2016 | Chai ................... G06F 16/9024 707/E17.014 |

(Continued)

OTHER PUBLICATIONS

PCT/US2020/036595, International Search Report and Written Opinion dated Oct. 9, 2020, 14 pages.

*Primary Examiner* — Samuel G Neway
(74) *Attorney, Agent, or Firm* — Patterson + Sheridan, LLP

(57) ABSTRACT

Certain aspects of the present disclosure provide techniques for node matching with accuracy by combining statistical methods with a knowledge graph to assist in responding (e.g., providing content) to a user query in a user support system. In order to provide content, a keyword matching algorithm, statistical method (e.g., a trained BERT model), and data retrieval are each implemented to identify node(s) in a knowledge graph with encoded content relevant to the user's query. The implementation of the keyword matching algorithm, statistical method, and data retrieval results in a matching metric score, semantic score, and graph metric data, respectively. Each score associated with a node is combined to generate an overall score that can be used to rank nodes. Once the nodes are ranked, the top ranking nodes are displayed to the user for selection. Based on the selection, content encoded in the node is displayed to the user.

20 Claims, 6 Drawing Sheets

(56) References Cited

U.S. PATENT DOCUMENTS

| | | | |
|---|---|---|---|
| 2016/0179945 A1* | 6/2016 | Lastra Diaz | G06F 16/284 |
| | | | 707/739 |
| 2018/0232376 A1 | 8/2018 | Zhu et al. | |
| 2018/0349755 A1* | 12/2018 | Gao | G06F 16/243 |
| 2019/0146985 A1* | 5/2019 | Zou | G06F 16/322 |
| | | | 707/715 |
| 2019/0188326 A1 | 6/2019 | Daianu et al. | |
| 2020/0074322 A1* | 3/2020 | Chungapalli | G06K 9/6282 |
| 2021/0158144 A1* | 5/2021 | Coulombe | G06F 16/9024 |

\* cited by examiner

COMBINING STATISTICAL METHODS WITH A KNOWLEDGE GRAPH

INTRODUCTION

Aspects of the present disclosure relate to a method and system for providing content from a knowledge graph to a user interacting with a user support system by combining statistical methods.

BACKGROUND

Organizations implement user support systems in order to provide users (e.g., customers, potential customers, employees, advertisers, clients, etc.) with the resources for assistance regarding products and/or services offered by that organization. In an effort to efficiently address the queries of users in a timely manner, organizations implement automated user support systems. For example, an organization can implement a conversational user interface to provide assistance to users. In such cases, a user can interact with an AI (e.g., a virtual agent or a chatbot) using natural language so that the user does not have to translate either the query to or response from the AI.

In moving towards automated user support for users, organizations can overlook or fail to successfully incorporate all of the resources available to the organization for user support. For example, an organization can have at its disposal a knowledge graph. The knowledge graph comprises a set of nodes with encoded content that models a knowledge domain. Each node in the knowledge graph is linked to another node based on a relationship between the encoded content. However, the organization can lack the ability to successfully incorporate the knowledge within the knowledge graph (e.g., content encoded in node(s)) to the user support system. In particular, the organization can face difficulty in determining which content a user is referring to in a query.

Conventional methods and systems fail to successfully incorporate a knowledge graph into a user support system. For example, in some cases, using only a trained model (e.g., a build classification model) places a strain on resources of an organization because training the model requires large amounts of manually generated data. As a result, a large portion of an organization's resources are devoted to manually generating data for training purposes, which are resources that could be utilized elsewhere in the organization. Additionally, relying only on rule-based or keyword matching can fail to take into consideration semantic meaning or colloquial terms. For example, a semantic issue can arise when how a user phrases a query does not match how the content is encoded in a graph node. In another example, colloquial terms used by a user in a query have different implications depending on the knowledge domain. For example, the query "How much money did I make last year?" can refer to either the category gross income or adjusted gross income within the domain of tax knowledge, both of which have different meanings (as well as tax implications).

As such, a solution is needed to incorporate a knowledge graph to a user support system that includes accurately matching a user's query to a node encoded with content in the knowledge graph.

BRIEF SUMMARY

Certain embodiments provide a method for increasing the accuracy of node matching to provide content to users from a knowledge graph by combining statistical methods. The method generally includes receiving, via a conversational user interface, a query. The method further includes executing, based on the query, a keyword matching algorithm on a knowledge graph comprising a set of nodes, wherein each node includes content and a descriptive label. The method further includes generating a matching metric score for each node of the knowledge graph to the query based on the keyword matching algorithm. The method further includes identifying, based on the matching metric score, a subset of nodes with matching metric scores that meet a threshold. The method further includes calculating a semantic score for each pairing of the query and a node in the subset of nodes by extracting a vector representation of each query and node pairing with a neural network model. The method further includes retrieving a graph metric data for each node in the subset of nodes. The method further includes generating an overall score for each node in the subset of nodes based on the matching metric score, the semantic score, and the graph metric data. The method further includes ranking each node in the subset of nodes according to the overall score of the node. The method further includes presenting the descriptive label of each node according to the ranking in the conversational user interface.

Other embodiments provide systems configured to perform the aforementioned method to increase accuracy of node matching to provide content to users from a knowledge graph by combining statistical methods. Additionally, other embodiments provide non-transitory computer-readable storage mediums comprising instructions that, when executed by a processor of a user support system (e.g., a computing system), causes the user support system to perform methods for increasing accuracy of node matching to provide content to users from a knowledge graph by combining statistical methods.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
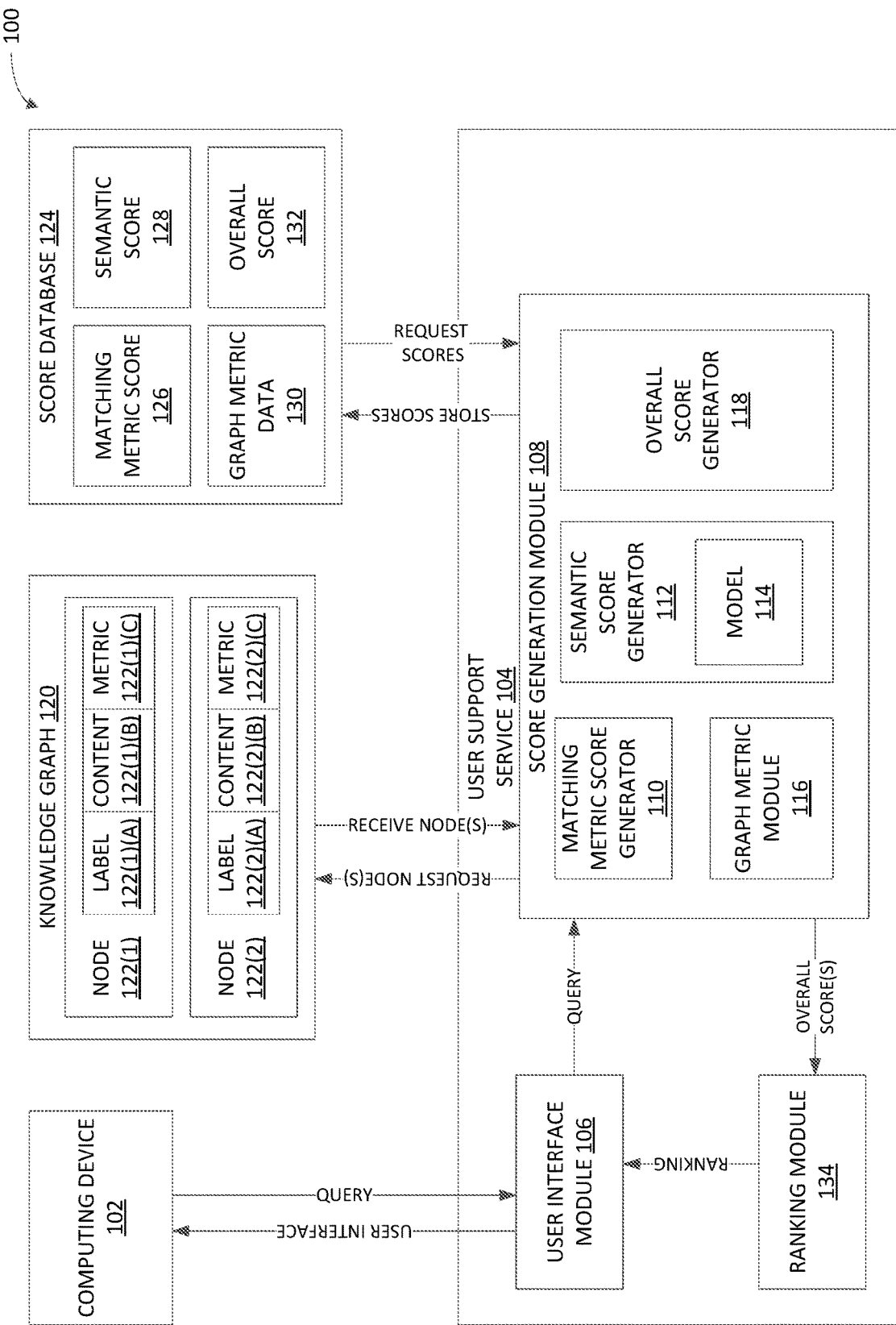
FIG. 1 depicts an example system for providing content to a user from a knowledge graph by combining statistical methods according to an embodiment.

Aspects of the present disclosure provide apparatuses, methods, processing systems, and computer-readable mediums for node matching with accuracy by combining statistical methods with a knowledge graph to assist in responding to queries of users in a user support system.

In order to match a user's query to content encoded in a node, statistical methods are combined with a knowledge graph, which results in a more efficient and accurate method of matching a user's query to content in a user support system. In one embodiment, a user support system can receive a user's query via a conversational user interface (CUI) (e.g., the user's query can be an audio query or a text query received at the CUI). To provide the user with content from the knowledge graph that matches the query, the user support system generates a set of scores to predict the node(s) that have encoded content to provide in response to the query. The set of scores is based on implementing a combination of statistical methods, including a keyword matching algorithm, a trained neural network model, and data retrieval of knowledge graph properties of a node. The content from the knowledge graph that matches the user's query can be a rule (e.g., a business or organization rule), a regulation, information, and/or data pertaining to the knowledge domain.

Upon receiving the user's query, a keyword-matching algorithm is executed on the knowledge graph that includes a set of nodes. For example, the keyword-matching algorithm (e.g., a trigram matching algorithm) is run on each node of the knowledge graph, calculating the matching metric score for each node. For example, a matching metric score can be an intersection-over-union metric, a Jaccard index, or a cosine similarity. The matching metric score determines a measurement of how similar data objects are—the smaller the distance between data objects, the greater degree of similarity between the data objects, and the greater the distance measured between data objects, the less similar there is between the data objects. In such cases, the keyword-matching algorithm identifies a subset of nodes that have keywords encoded as content in knowledge graph nodes that match the user's query. For example, the subset of nodes with a matching metric score that meets (or exceeds) a threshold is identified. The execution of this particular algorithm results in a high recall but low precession identification of the subset of nodes from the knowledge graph.

Following the execution of the keyword matching algorithm and identification of the subset of nodes meeting the threshold, a semantic score is generated for the subset of nodes. The semantic score determines how similar the meaning of the user's query is to the content encoded in each node. In some cases, a semantic score is a Sinkhorn distance, Euclidean distance, cosine distance, Manhattan distance, or another distance that is measured over continuous vectors. To calculate the semantic score between the query and each node, a vector representation of a query and node pairing is identified (and extracted) using a neural network model. In some cases, the neural network model is a trained Bidirectional Encoder Representations from Transformers (BERT) model. The BERT model can take as input the user's query and content encoded in the node and provide as output a vector representation of the user's query and encoded node content. Based on the vector representation, a semantic score can be generated, indicating how semantically similar the user's query is to the content encoded in a pairing.

Once each pairing of a user query and node has a semantic score generated, graph metric data is retrieved for each node. Graph metric data is indicative of graph properties of a node or relevance. For example, graph metric data includes the depth of the node or the position of the node in the knowledge graph. After the graph metric data is retrieved, the graph metric data is combined with the matching metric score and the semantic score to generate an overall score for each node. In some cases, the combination of the matching metric score, semantic score, and graph metric data is predefined by an administrator of the system.

With the overall score for each node determined, the nodes can be ranked according to the overall score. For example, the node with the highest overall score is ranked first, followed by the node with the second highest score, and so on. In some cases, only the top X number of nodes are ranked, where "X" represents a non-zero whole number. In such cases, once the top X number of nodes are identified, then the ranking of the remaining nodes can be discontinued. After the ranking of the top X nodes is complete, the descriptive labels (e.g., "labels") associated with each of the top-X nodes are retrieved and displayed to the user in the CUI. For example, the top 3 nodes are ranked according to the overall score, and the descriptive label of each of the 3 nodes is retrieved and displayed to the user in the CUI.

In some cases, the user selects the descriptive label associated with the first ranked node. In other cases, the user can select another, lower ranked node. Based on the user selection received via the CUI, the content of the node is displayed to the user. Further, the user selection is included as feedback to the neural network model, which undergoes continuing training. In some cases, the continuous training of the neural network model is semi-supervised.

As described, the combination of graph analysis, statistical machine learning, and informational retrieval results in the ability to generate a custom classifier in the user support system capable of matching a user's query to content encoded in a node without requiring a large amount of training data.

Example System for Providing Content to a User

FIG. 1 depicts an example system 100 for providing content to a user based on matching a user's query to content encoded in a node by combining statistical methods. The example system 100 is a user support system that includes a computing device 102, a user support service 104, a knowledge graph 120, and a score database 124.

The user support service 104 can determine, based on the query received via a computing device 102 (e.g., from a user), a matching node in a knowledge graph with encoded content to provide to a user. In some cases, the user support service 104 can predict the node with encoded content that will most likely provide the user an answer to their query. In one embodiment, the user support service 104 can include a user interface module 106, a score generation module 108, and a ranking module 134. Additionally, the user support service 104 can include a knowledge graph 120 and a score database 124 located locally or remotely. The user interface module 106 of the user support service 104 provides a user interface to the computing device 102 in order for a user (e.g., a customer, employee, potential customer, client, advertiser, etc.) to interact with the user support service 104. In some cases, the user interface provided to the user is a conversational user interface (CUI), which allows for user interaction with the user support service 104 via the computing device 102 in a conversational manner, using natural language. For example, the user can pose a query to the user support service 104 either by speaking directly (e.g., audio data) or writing (e.g., text data) the query to the CUI on the computing device 102, which has input/output components such as a display screen and microphone to assist in the interaction between the user and the user support service 104.

After receiving a query from the user via the computing device 102, the user interface module 106 provides the query to the score generation module 108. The score generation module 108 includes a matching metric score generator 110, a semantic score generator 112, a graph metric module 116, and an overall score generator 118. Upon receiving the query, the matching metric score generator 110 of the score generation module 108 executes a matching algorithm on each node 122 of a knowledge graph 120. In some cases, the matching algorithm includes a keyword matching algorithm (e.g., a trigram algorithm, Jaro-Winkler algorithm, Levenshtein algorithm, etc.).

The knowledge graph 120 includes a set of nodes 122 that models a particular knowledge domain (e.g., a tax preparation knowledge domain, medical knowledge domain, etc.). Each node 122 (e.g., node 122(1), node 122(2), etc.) includes a label, content, and metric. For example, node 122(1) includes a label 122(1)(A) of the encoded content 122(1)(B) stored in the node 122(1). The label 122(1)(A) can be an identifier or description of the content 122(1)(B). In some cases, the label 122(1)(A) can include a question that the content 122(1)(B) encoded in the node 122(1) answers. The encoded content of node 122 is data from the knowledge domain. The node 122(1) also includes a metric 122(1)(C) indicating a location of the node 122(1) in relation to other nodes in the knowledge graph 120. In some cases, the metric 122(1)(C) can indicate the position of the node 122(1) in the knowledge graph 120, or the metric 122(1)(C) can indicate the depth of the node 122(1) in the knowledge graph 120. In other cases, the metric 122(1)(C) can be a relevance metric regarding the content (e.g., PageRank or HITS) and how relevant the content within the node is to a user. For example, with broad or frequently asked questions, the content can be in a node with a higher position in comparison to a narrow or detailed question in which the node containing content is at lower position. In some cases, the depth of the node reflects the importance of the node. For example, a node in a higher position can include more useful information in comparison to a node in a lower position. As such, the overall score of a node can include a weight representing the depth of the node. In some cases, the degree and/or centrality of a node can determine popularity of node because of how often the node is traversed, which can be used to scale the importance of the node in calculating the overall score.

By executing a matching algorithm on a knowledge graph 120, a matching metric score 126 is generated for each node 122. The matching metric score 126 can indicate how many terms in a user's query and a node 122 match. For example, a matching metric score can be an intersection-over-union metric, a Jaccard index, or a cosine similarity. Based on the matching metric score 126 generated for each node 122, a subset of nodes 122 in the knowledge graph 120 can be identified that meet a threshold value. In some cases, the threshold value of the matching metric score can be pre-determined by an administrator associated with the user support service 104. The execution of a matching algorithm on a knowledge graph 120, which is akin to a "fuzzy search," results in a high recall but low precision identification of nodes 122 that have content associated with the user's query. Through the execution of the matching algorithm, a subset of nodes are identified from the knowledge graph 120, though the degree of relevance to the user's query can vary. As such, the identification of a subset of nodes makes subsequent calculations related to semantic and graph analysis quicker because not every node in the knowledge graph is analyzed.

Once a subset of nodes 122 are identified as meeting (or exceeding) the threshold value of a matching metric score, the semantic score 128 is generated by a semantic score generator 112. For example, a semantic score is a Sinkhorn distance, Euclidean distance, cosine distance, Manhattan distance, or another distance that is measured over continuous vectors The semantic score generator 112 includes a neural network model 114 ("model"). In some cases, the model 114 is a trained Bidirectional Encoder Representations from Transformers (BERT) model, Glove, Word2Vec, ULMFit, Open AI Transformer, RoBertA, etc. Initially, the training of the neural network model is unsupervised. The neural network model can take a pairing of an identified node and the user's query as input and transform the pairing into a vector representation that can be used to calculate the semantic score 128 for the pairing by the semantic score generator 112.

In addition, the graph metric module 116 of the score generation module 108 can retrieve metric (e.g., 122(1)(C), 122(2)(C), etc.) from the knowledge graph 120 associated with each node identified as meeting the matching metric score threshold. In some cases, the metrics are stored in the score database 130 as graph metric data 130. With the matching metric score 126, semantic score 128, and graph metric data 130, the overall score 132 is generated by the overall score generator 118. In some cases, the overall score generator 118 can combine the matching metric score 126, semantic score 128, and graph metric data 130 according to a pre-determined combination established by an administrator associated with the user support service 104. For example, the overall score generator 118 can combine the scores by basic arithmetic (e.g., adding, multiplying, or a combination of both) or on a conditional basis such as combining the scores if one, two, or all three scores reach a minimum value. In some cases, the overall score 132, along with the matching metric score 126, semantic score 128, and graph metric data 130, are stored in the score database 124.

Once the overall score 132 is generated for each identified node, the ranking module 134 can retrieve the overall scores 132 and rank the identified nodes 122 according to the overall score 132. For example, the node with the highest-ranking overall score 132 is ranked first (e.g., node 122(1)) followed by the node with the second-highest-ranking overall score (e.g., node 122(2)). In some cases, the user support service 104 provides the user the top X nodes (where "X" is a non-zero whole number). In such cases, the ranking module 134 discontinues the ranking procedure when the top X nodes are identified. In other cases, the ranking module 134 can rank each node 122 identified as meeting the matching metric score 126.

Upon the ranking module 134 completing the ranking of nodes 122, the user support service 104 retrieves the labels associated with each of the top X nodes. The retrieved labels describing each node 122 are presented to the user via the user interface on the computing device 102. Based on the user selection of a label of a node, the corresponding content is displayed to the user. In some cases, the user can select the first ranked node. In other cases, the user can select a lower ranked node. Upon user selection of a label, the user support service 104 retrieves corresponding content from the knowledge graph 120 to display to the user. In other cases, the user can indicate that none of the nodes respond to the query. In such cases, nodes that ranked lower than the top X can be displayed, or the user can be placed in a queue for a virtual or live agent associated with the user support service 104. Regardless of which node the user selected (or did not select), the user's interaction with the user support system is feedback for continuing, semi-supervised training of the neural network model 114.

Example Flow Diagram of Providing Content to a User

Figure 2A:
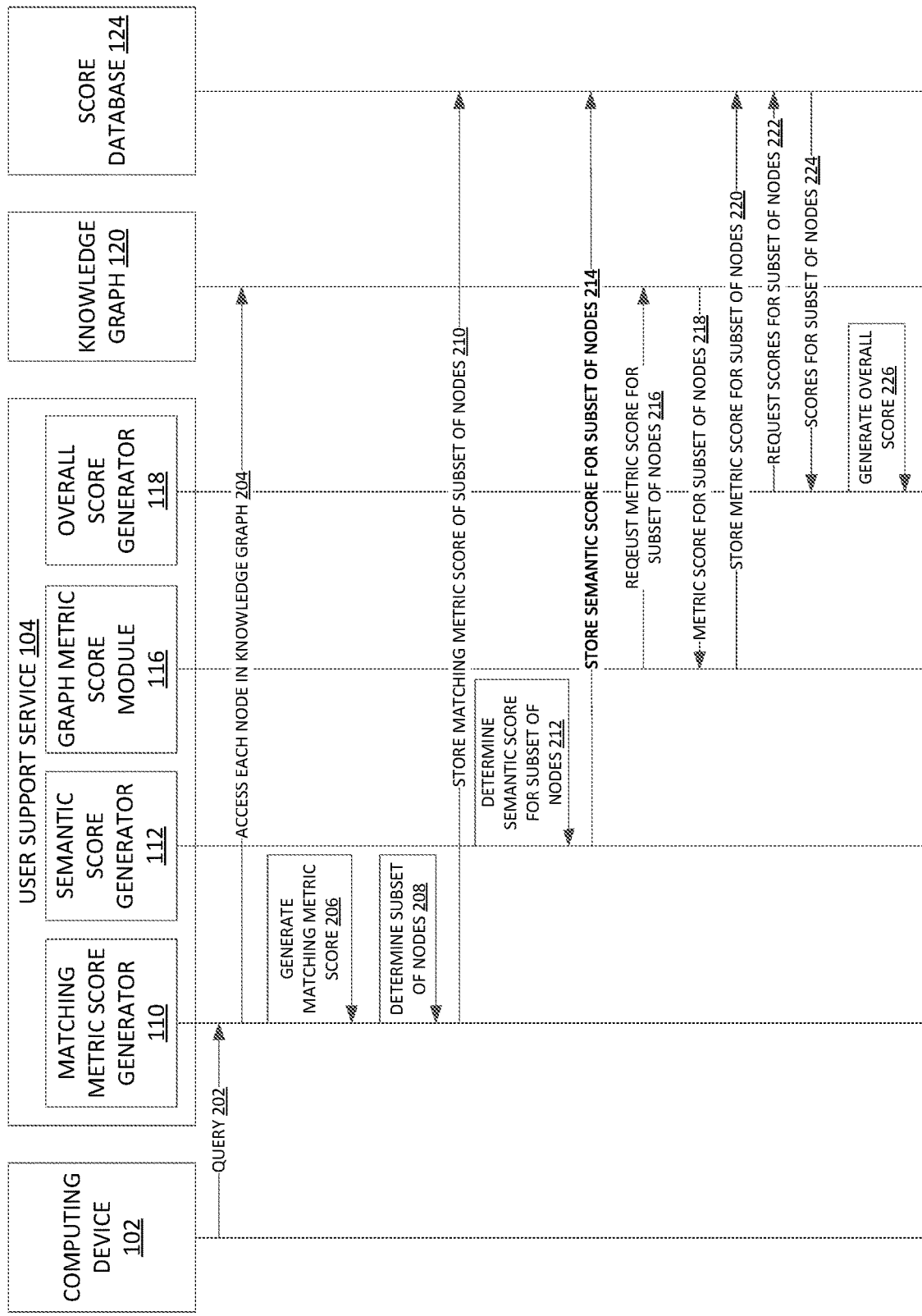
FIGS. 2A-2B depict an example flow diagram for providing content to a user from a knowledge graph by combining statistical methods according to an embodiment.
Figure 2B:
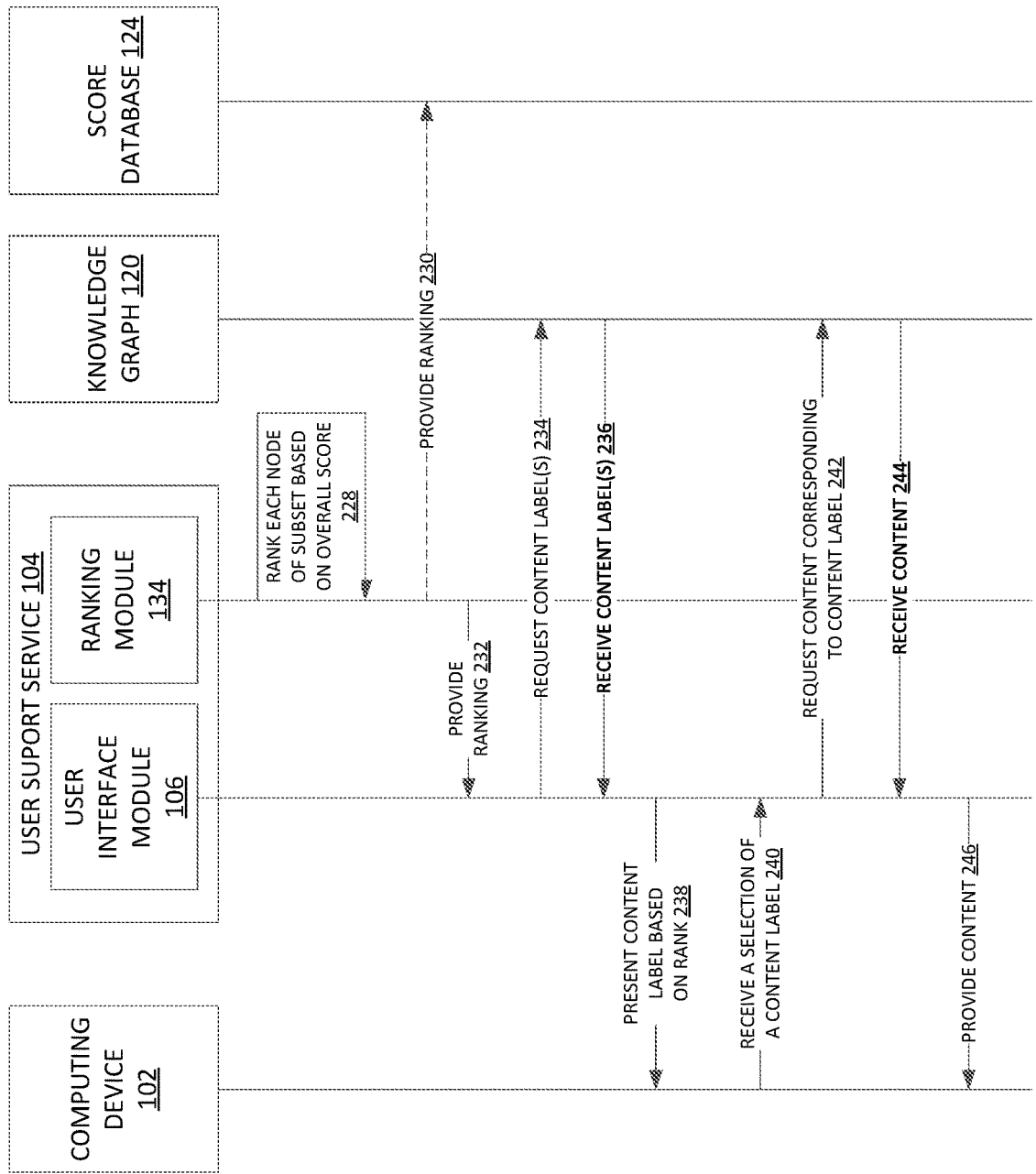

FIGS. 2A-2B depict an example flow diagram for providing content to a user by generating a set of scores from a combination of statistical methods in order to match a user query to content encoded in a node. A user support service can generate an overall score based on a matching metric score, semantic score, and graph metric data, each of which is generated by graph analysis, statistical machine learning, and informational retrieval.

As depicted in FIG. 2A, the flow diagram starts at 202 when the matching metric score generator 110 of the user support service 104 receives a query (e.g., from a user) via a computing device 102. In some cases, the user provides the query to the user support service 104 via a user interface (e.g., a CUI) displayed in the computing device 102. In such cases, the user interface is provided to the computing device 102 via a user interface module (not depicted) in the user support service 104. After receiving the query from the user, the matching metric score generator 110, at 204, accesses each node in a knowledge graph 120 to execute a matching algorithm at each node so that at 206, the matching metric score generator 110 can generate a matching metric score for each node.

At 208, the matching metric score generator 110 can identify a subset of nodes that have a corresponding matching metric score that meets (or exceeds) a threshold value. The matching metric scores of the subset of nodes are stored at 210 in the score database 124. After storing the matching metric scores, the semantic score generator 112 determines at 212 the semantic score for each node in the subset of nodes. The semantic score generator 112 does this by extracting a vector representation of the user's query and each node in the subset of nodes. In some cases, the vector representation is extracted via a model (not depicted) that is a trained BERT neural network model. At 214, the semantic score for each node in the subset is stored in the score database 124.

Upon storing the semantic scores, the graph metric module 116 requests at 216 and receives at 218 the graph metric data for each node in the subset of nodes from the knowledge graph 120. In some cases, the graph metric data is stored at 220 in the score database 124. In such cases, the overall score generator 118 at 222 requests the graph metric data from the score database 124 along with the matching metric score and the semantic score. In other cases, the graph metric module 116 directly sends the graph metric data to the overall score generator 118. After the overall score generator 118 receives the scores at 224 from the score database 124, the overall score generator 118 generates at 226 the overall score for each node in the subset based on the matching metric score, semantic score, and graph metric data. Each score used to calculate the overall score represents the result of implementing a matching algorithm, trained BERT model, and data retrieval—the combination of which results in a more accurate determination of the relevance of content to a user query.

FIG. 2B depicts a continuation of the flow diagram of presenting content encoded in a node to a user based on a set of scores, as described in FIG. 1-2A.

As depicted in FIG. 2B, the overall score generator 118 after generating the overall score for each node in the subset of nodes proceeds to send the overall scores to the ranking module 134 in the user support service 104. The ranking module 134 determines at 228, the rank of each node in the subset of nodes. In some cases, the ranking module 134 can discontinue determining the rank of nodes once a ranking of the top X nodes is completed. After determining the ranking of nodes, the ranking is stored at 230 in the score database 124 and then at 232 provided to the user interface module 106. In other cases, the ranking module 134 can directly provide the ranking of the nodes at 232 to the user interface module 106.

After receiving the ranking, the user interface module 106 can request at 234 and receive at 236 the labels corresponding to each ranked node. In some cases, the user interface module 106 can retrieve the labels associated with the top X nodes. Once the labels are received, the user interface module 106 presents to the user at 238 each label describing the content of the ranked nodes. In such cases, the user interface module 106 presents a user interface to a user at the computing device 102. The user interface module 106 receives at 240 a selection from the user of a label corresponding to content in a node.

Upon receiving the selection from the user of a content label, the user interface module 106 requests at 242 and receives at 244 content encoded in the node corresponding to the label selected by the user to provide at 246 the content to the user via the computing device 102.

Example User Interfaces Displayed to a User

Figure 3B:
FIGS. 3A-3B depict example user interfaces displayed to a user according to an embodiment.
Figure 3A:

FIGS. 3A-3B depict example user interfaces 300 and 350 displayed to a user via a computing device. With the example user interfaces 300 and 350, the user can interact with the user support service. As depicted in FIGS. 3A and 3B, the user can pose a query to the user support service. In some cases, the query can be provided to the user interface as audio data. In other cases, the query can be provided to the user interface as text data, video data, or gesture data. For example, the user can pose the query using a camera recording the user, such that the user support service receives a video of a user verbally speaking or through gesture-based communication (e.g., sign language).

In the example user interface 300, the user poses the query "Do I owe self-employment tax?" The user support service receives the query and determines the matching metric score for each node in a knowledge graph to identify a subset of nodes within the knowledge graph that meet a threshold value. Once the subset of nodes is identified, the user support service calculates the semantic score and retrieves the graph metric data for each node in order to generate an overall score for each node in the subset of nodes. With the overall score generated, the user support service ranks the nodes and provides a set of labels in response to the query.

As illustrated in FIG. 3A, the user support service provides a prompt to the user to "Select from the following to learn more:" with the following descriptive labels displayed: "How did we calculate self employment tax?", "What if I can't pay the taxes I owe?", and "How can I better prepare for next year?" The descriptive labels of the three nodes displayed each have an overall score that the user support service has determined (or predicted) to have content encoded within that can properly address the user's query. In some cases, the user support service can provide the labels in ranking order of the overall scores calculated according to the relevance to the user's query. For example, the content associated with the descriptive label "How did we calculate self employment tax?" is ranked first with the highest overall score, followed by the other two descriptive labels.

The user support service also prompts the user for feedback to determine whether the nodes identified answers the query. The user can provide select a node and provide feedback via text, audio, and/or touch input to the computing device.

In some cases, as depicted in FIG. 3B, the example user interface 350 can display the content encoded in the first ranked content node and provide the user descriptive labels for lower ranked content nodes. In such cases, the user can review the content provided in the first ranked node and select a descriptive label to receive content from a lower ranked content item. For example, the user can select a lower ranked label to get additional content if the content in the first ranked node fails to provide the user with the content the user was searching for or if the user is interested in learning more on the topic. The user can select a lower ranked label via text, audio and/or touch input.

Further, the user can provide feedback via the example user interfaces 300 and 350. As depicted, after the node labels are displayed, the user is presented the option of whether the labels and/or content provided are helpful (e.g., "Did that answer your question?"). For example, the user can indicate the content provided is helpful (e.g., "Yes, thanks!") or not helpful (e.g., "Not really").

Example Method for Providing Content to a User

Figure 4:
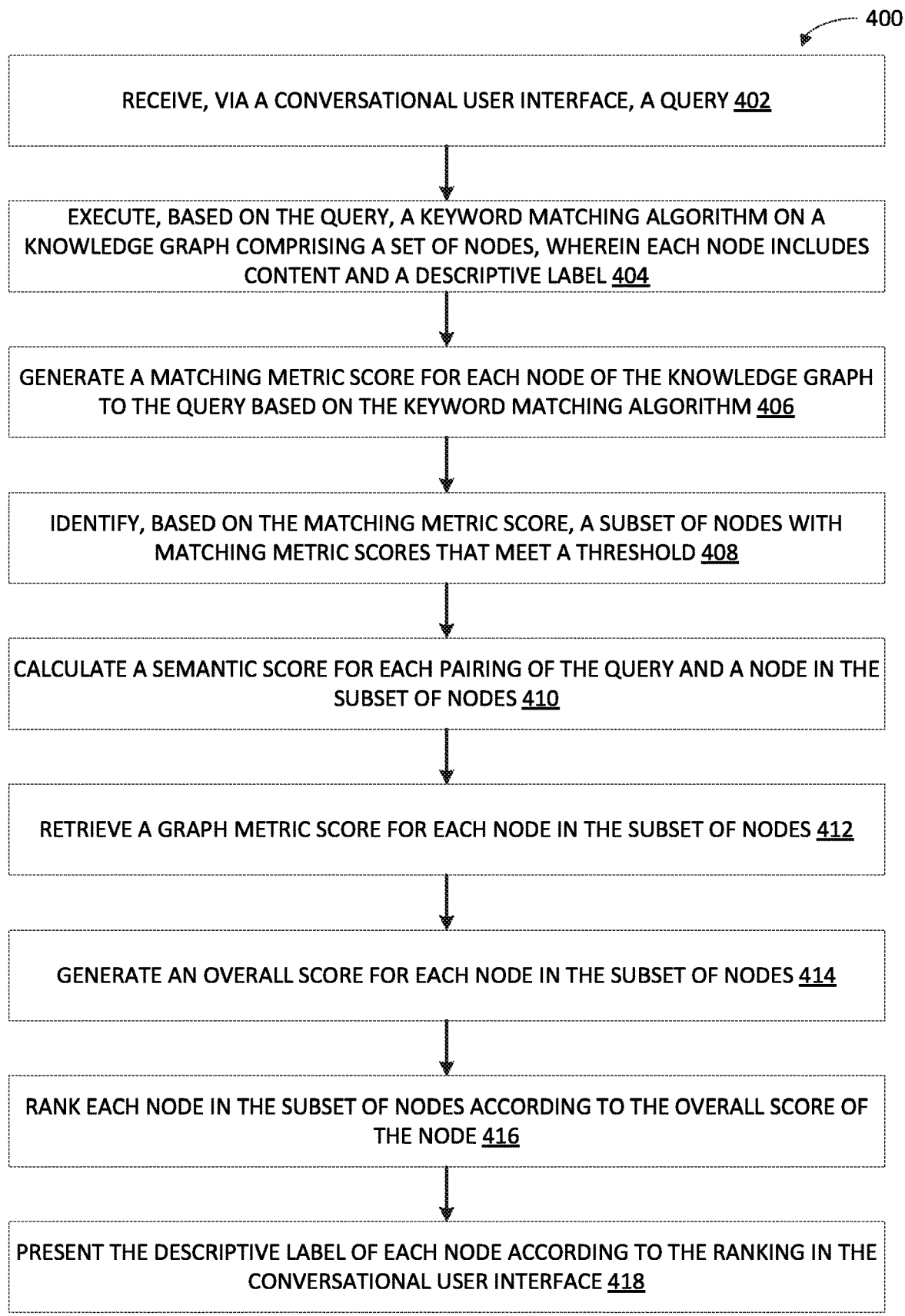
FIG. 4 depicts an example method for providing content to a user in a user support system from a knowledge graph according to an embodiment.

FIG. 4 depicts an example method 400 for providing content to a user by matching a user's query to a node in a knowledge graph with accuracy, as described with respect to FIGS. 1-3B.

At 402, a user support service receives, via a conversational user interface, a query. In some cases, the query can be audio data, text data, video data, etc. In some cases, the query can be from a user of the user support service.

At 404, a user support service executes, based on the query, a keyword matching algorithm on a knowledge graph. The knowledge graph can include a set of nodes that each has encoded content and a descriptive label. In some cases, the keyword matching algorithm is a trigram matching algorithm. The execution of a keyword matching algorithm results in determining nodes with high recall but low precision. In some cases, a node can include graph metric data (e.g., depth or position of a node in knowledge graph) or relevance metric data (PageRank or HITS).

At 406, the user support service generates a matching metric score for each node of the knowledge graph and the query based on the keyword matching algorithm.

At 408, the user support service identifies, based on the matching metric score, a subset of nodes with matching metric scores that meet (or exceed) a threshold value.

At 410, the user support service calculates a semantic score for each pairing of the query and a node in the subset of nodes. In some cases, the semantic score for a pairing is determined by a trained BERT neural network model that takes the user query and node content as input and provides as output a vector representation of the user query and node content. The vector representation can be used to determine the semantic similarity between the user query and the node content. Further, such calculation can increase the precision of matching the user query to a particular node.

At 412, the user support service retrieves a graph metric data for each node in the subset of nodes. The graph metric can be retrieved from the corresponding node in the knowledge graph. In some cases, the graph metric can include a depth or position of the node in the knowledge graph.

At 414, the user support service generates an overall score for each node in the subset of nodes. The overall score is generated by combining the matching metric, semantic score, and graph metric data for each node. The combination of the overall score is pre-determined, in some cases, by an administrator associated with the user support service. For example, the combination can be based on arithmetic calculations such as addition or multiplication. In another example, the user support service can generate an overall score upon the condition one, two, or all three scores meeting a minimum value.

At 416, the user support service ranks each node in the subset of nodes according to the overall score of the node.

At 418, the user support service presents the descriptive label of each node according to the ranking in the CUI.

In some cases, after the user support service presents the descriptive labels to the user via the CUI, the user support service can receive a selection of a label. Upon receiving a selection of a label describing the content in a node, the user support service retrieves the encoded content from the corresponding node and presents the content to the user. In some cases, the user selection is provided as feedback to the neural network model. In other cases, the user may not select a descriptive label displayed. In such cases, the outcome of the user's interaction with the user support service is feedback for continuous learning of the neural network model. As opposed to the initial training of the neural network model, which is unsupervised, the continuing training of the neural network model is semi-supervised.

Example Server in a User Support System

Figure 5:
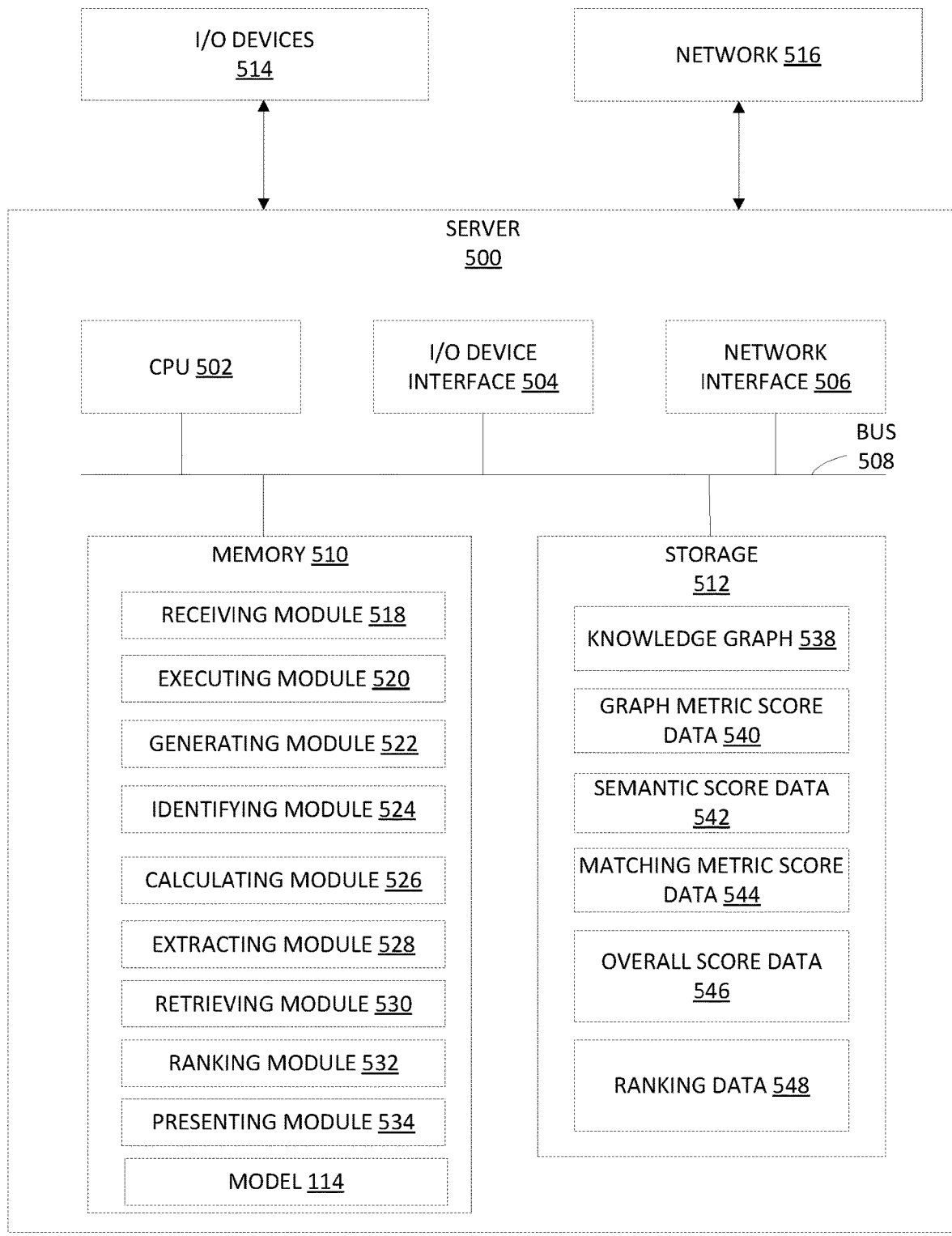
FIG. 5 depicts an example server for a user support system to provide content to a user according to an embodiment.

FIG. 5 depicts an example server 500 in a user support system (e.g., a computing system) that may perform the methods described here, such as the method for node matching with accuracy described with respect to FIGS. 1-4.

Server 500 includes a central processing unit (CPU) 502 connected to a data bus 508. CPU 502 is configured to process computer-executable instructions, e.g., stored in memory 510 or storage 512, and to cause the server 500 to perform methods described herein, for example, with respect to FIGS. 1-4. CPU 502 is included to be representative of a single CPU, multiple CPUs, a single CPU having multiple processing cores, and other forms of processing architecture capable of executing computer-executable instructions.

Server 500 further includes input/output (I/O) device(s) 514 and interfaces 504, which allow server 500 to interface with input/output devices 514, such as, for example, keyboards, displays, mouse devices, pen input, and other devices that allow for interaction with server 500. Note that server 500 may connect with external I/O devices through physical and wireless connections (e.g., an external display device).

Server 500 further includes a network interface 506, which provides server 500 with access to external network 516 and thereby external computing devices.

Server 500 further includes memory 510, which in this example includes receiving module 518, executing module 520, generating module 522, identifying module 524, calculating module 526, extracting module 528, retrieving module 530, ranking module 532, presenting module 534, and model 114 for performing operations described in FIGS. 1-4.

Note that while shown as a single memory 510 in FIG. 5 for simplicity, the various aspects stored in memory 510 may be stored in different physical memories, but all accessible by CPU 502 via internal data connections such as bus 508.

Storage 512 further includes knowledge graph 538, which may be like the knowledge graph as described in FIGS. 1-4.

Storage 512 further includes graph metric data 540, which may be like the metrics retrieved from the knowledge graph, as described in FIGS. 1-4.

Storage 512 further includes semantic score data 542, which may be like the generated semantic score, as described in FIGS. 1-4.

Storage 512 further includes matching metric score data 544, which may be like the matching metric score, as described in FIGS. 1-4.

Storage 512 further includes overall score data 546, which may be like the overall score generated based on the graph metric data, semantic score, and matching metric score, as described in FIGS. 1-4.

Storage 512 further includes ranking data 548, which may be like the ranking associated with a node, as described in FIGS. 1-4.

While not depicted in FIG. 5, other aspects may be included in storage 512.

As with memory 510, a single storage 512 is depicted in FIG. 5 for simplicity, but various aspects stored in storage 512 may be stored in different physical storages, but all accessible to CPU 502 via internal data connections, such as bus 508, or external connections, such as network interfaces 506. One of skill in the art will appreciate that one or more elements of server 500 may be located remotely and accessed via a network 516.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced, using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates the transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During the execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein but are to be accorded the full scope consistent with the language of the claims. Within a claim, a reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    receiving, via a conversational user interface, a query;
    executing, based on the query, a keyword matching algorithm on a knowledge graph comprising a set of nodes, wherein each node includes content and a descriptive label;
    generating a matching metric score for each node of the knowledge graph to the query based on the keyword matching algorithm;
    identifying, based on the matching metric score, a subset of nodes with matching metric scores that meet a threshold;
    calculating a semantic score for each pairing of the query and a node in the subset of nodes by:
        extracting a vector representation of each query and node pairing with a neural network model;
    retrieving a graph metric data for each node in the subset of nodes;
    generating an overall score for each node in the subset of nodes based on:
        the matching metric score,
        the semantic score, and
        the graph metric data;
    ranking each node in the subset of nodes according to the overall score of the node; and
    presenting the descriptive label of each node in the subset of nodes according to the ranking in the conversational user interface.

2. The method of claim 1, wherein the neural network model is a Bidirectional Encoder Representations from Transformers (BERT) model.

3. The method of claim 1, further comprising:
    receiving, via the conversational user interface, a selection of a node in the ranking based on the corresponding descriptive label; and
    presenting the content associated with the selected node in the conversational user interface.

4. The method of claim 3, wherein the selection of the node is feedback in continuing training of the neural network model.

5. The method of claim 1, wherein the query is an audio query.

6. The method of claim 1, wherein the keyword matching algorithm is a trigram matching algorithm.

7. The method of claim 1, wherein the graph metric includes a position of the node in the knowledge graph or a relevance metric.

8. A system, comprising:
    a processor; and
    a memory storing instructions which when executed by the processor perform a method comprising:
        receiving, via a conversational user interface, a query;
        executing, based on the query, a keyword matching algorithm on a knowledge graph comprising a set of nodes, wherein each node includes content and a descriptive label;
        generating a matching metric score for each node of the knowledge graph to the query based on the keyword matching algorithm;
        identifying, based on the matching metric score, a subset of nodes with matching metric scores that meet a threshold;
        calculating a semantic score for each pairing of the query and a node in the subset of nodes by:
            extracting a vector representation of each query and node pairing with a neural network model;
        retrieving a graph metric data for each node in the subset of nodes;

generating an overall score for each node in the subset of nodes based on:
the matching metric score,
the semantic score, and
the graph metric data;
ranking each node in the subset of nodes according to the overall score of the node; and
presenting the descriptive label of each node in the subset of nodes according to the ranking in the conversational user interface.

9. The system of claim 8, wherein the neural network model is a Bidirectional Encoder Representations from Transformers (BERT) model.

10. The system of claim 8, further comprising:
receiving, via the conversational user interface, a selection of a node in the ranking based on the corresponding descriptive label; and
presenting the content associated with the selected node in the conversational user interface.

11. The system of claim 10, wherein the selection of the node is feedback in continuing training of the neural network model.

12. The system of claim 8, wherein the query is an audio query.

13. The system of claim 8, wherein the keyword matching algorithm is a trigram matching algorithm.

14. The system of claim 8, wherein the graph metric includes a position of the node in the knowledge graph or a relevance metric.

15. A non-transitory computer-readable storage medium comprising instructions that, when executed by one or more processors of a computing system, cause the computing system to perform a method, the method comprising:
receiving, via a conversational user interface, a query;
executing, based on the query, a keyword matching algorithm on a knowledge graph comprising a set of nodes, wherein each node includes content and a descriptive label;
generating a matching metric score for each node of the knowledge graph to the query based on the keyword matching algorithm;
identifying, based on the matching metric score, a subset of nodes with matching metric scores that meet a threshold;
calculating a semantic score for each pairing of the query and a node in the subset of nodes by:
extracting a vector representation of each query and node pairing with a neural network model;
retrieving a graph metric data for each node in the subset of nodes;
generating an overall score for each node in the subset of nodes based on:
the matching metric score,
the semantic score, and
the graph metric data;
ranking each node in the subset of nodes according to the overall score of the node; and
presenting the descriptive label of each node in the subset of nodes according to the ranking in the conversational user interface.

16. The non-transitory computer-readable storage medium of claim 15, wherein the neural network model is a Bidirectional Encoder Representations from Transformers (BERT) model.

17. The non-transitory computer-readable storage medium of claim 15, further comprising:
receiving, via the conversational user interface, a selection of a node in the ranking based on the corresponding descriptive label; and
presenting the content associated with the selected node in the conversational user interface.

18. The non-transitory computer-readable storage medium of claim 17, wherein the selection of the node is feedback in continuing training of the neural network model.

19. The non-transitory computer-readable storage medium of claim 15, wherein the query is an audio query.

20. The non-transitory computer-readable storage medium of claim 15, wherein the keyword matching algorithm is a trigram matching algorithm.

* * * * *